United States Patent [19]
Contreras

[11] Patent Number: 5,323,189
[45] Date of Patent: Jun. 21, 1994

[54] ADJUSTABLE ANATOMICAL SPECTACLE FRAMEWORK SYSTEMS AND METHODS

[75] Inventor: Oscar F. Contreras, Park City, Utah

[73] Assignee: OCCM Expansion Systems, Inc., Salt Lake City, Utah

[21] Appl. No.: 963,879

[22] Filed: Oct. 20, 1992

[51] Int. Cl.$^5$ .......................... G02C 5/04; G02C 5/20
[52] U.S. Cl. ..................... 351/118; 351/42; 351/128; 351/158
[58] Field of Search ............. 351/41, 42, 107, 111, 351/115, 116, 118, 119, 120, 124, 128, 158, 227

[56] References Cited

U.S. PATENT DOCUMENTS

| | | | |
|---|---|---|---|
| 297,858 | 4/1884 | Smith et al. | 351/227 |
| 437,030 | 9/1890 | Hinden | 351/227 |
| 844,952 | 2/1907 | Mirovitch | 351/62 |
| 1,200,862 | 10/1916 | May | 351/227 |
| 1,206,134 | 11/1916 | Otte | 351/45 |
| 1,348,092 | 7/1920 | Day | 351/227 |
| 1,526,793 | 2/1925 | King | 351/130 |
| 1,528,192 | 3/1925 | Brierton | 604/20 |
| 1,621,629 | 3/1927 | Dawson | 2/448 |
| 1,794,571 | 3/1931 | Wrighton et al. | 351/227 |
| 2,064,812 | 12/1936 | Bouchard | 351/49 |
| 2,256,491 | 9/1941 | Peck et al. | 351/229 |
| 2,270,558 | 1/1942 | Riegler | 351/118 |
| 2,843,115 | 7/1958 | Aufricht | 606/204.45 |
| 2,856,813 | 10/1958 | Kudelko | 351/109 |
| 2,965,099 | 12/1960 | Aufricht | 606/204.45 |
| 3,854,801 | 12/1974 | Hoke | 351/118 |
| 4,792,221 | 12/1988 | Parks et al. | 351/120 |
| 5,223,861 | 6/1993 | Wagner | 351/119 |

FOREIGN PATENT DOCUMENTS 50030 of 1889 Fed. Rep. of Germany .
426884 of 1925 Fed. Rep. of Germany .

Primary Examiner—William L. Sikes
Assistant Examiner—David R. Parsons
Attorney, Agent, or Firm—Lynn G. Foster

[57] ABSTRACT

Adjustable pairs of eyeglasses are disclosed which retain the precise adjustments during long periods of wear. Apparatus and methods are provided for so adjusting rim separation at the bridge of the frame of the eyeglasses and for so adjusting the effective length of temples between shoulders and bow of the frame. Two embodiments of a special tool used in the adjustment processes is also provided 14 Claims, 3 Drawing Sheets

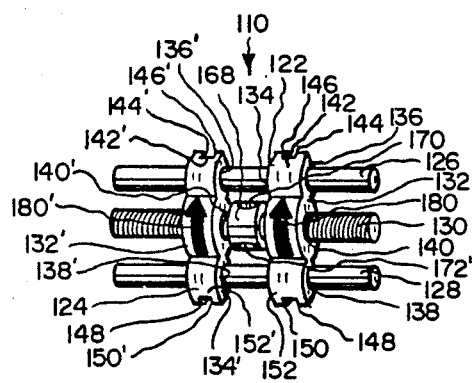
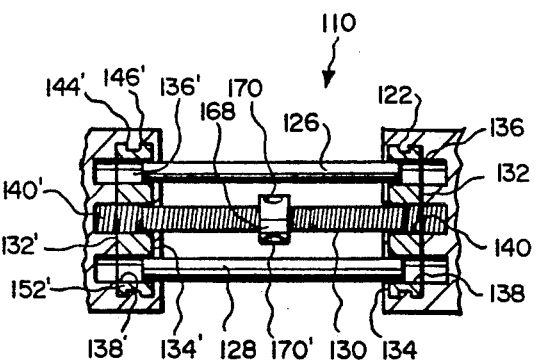
FIG. 3
FIG. 4
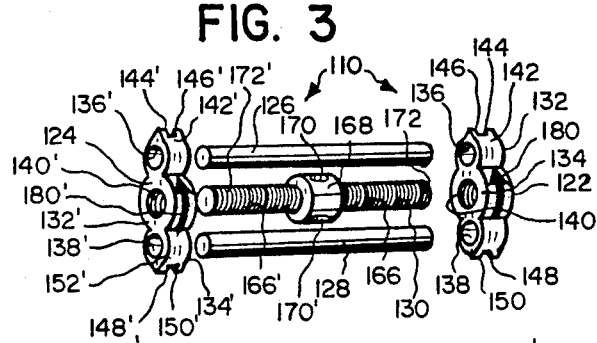
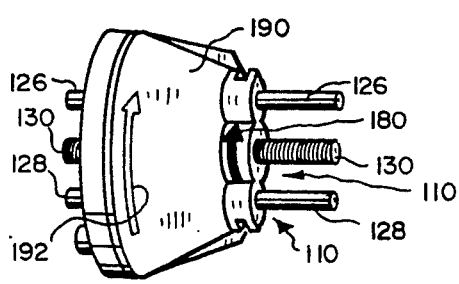
FIG. 5
FIG. 6
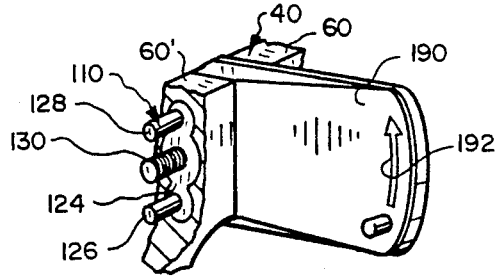
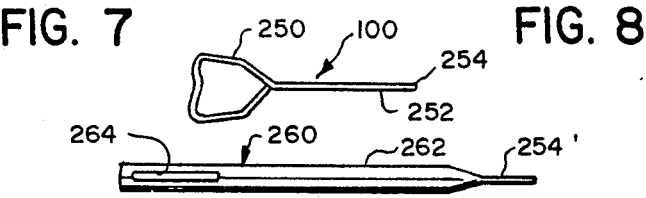
FIG. 7
FIG. 8
FIG. 9
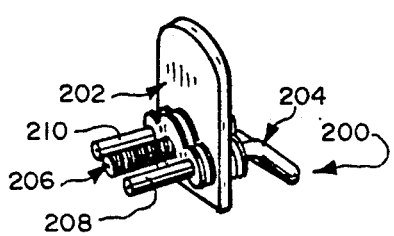
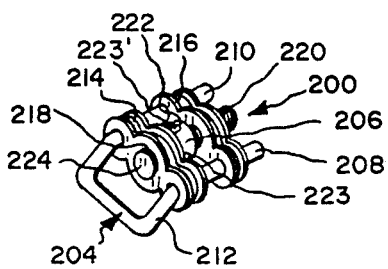
FIG. 10
FIG. 11

ADJUSTABLE ANATOMICAL SPECTACLE FRAMEWORK SYSTEMS AND METHODS

FIELD OF INVENTION

This invention relates to eyeglasses and in particular to eyeglasses with adjustable frames.

BACKGROUND AND DESCRIPTION OF RELATED ART

The necessity of custom fitting eyeglasses and their associated frame to an individual wearer of the glasses is well known in optometry. Discomfort associated with ill-fitting glasses is well known often used in commercial advertisements related to marketing of new eye wear. For this reason, it is common practice for an optometrist to carefully and precisely calibrate the dimensions of various critical head contacting points of each eyeglass frame to the widely variable facial characteristics of each wearer.

In a manufacturing or other high eye-hazard environments where the wearing of eyeglasses is mandatory to maintain an acceptable safety standard, it is important that eyeglasses be worn without noticeable or even sub-liminal discomfort so that proper attention can be continuously paid to work at hand. In such environments, it is common for safety glasses to be provided from a general, but usually limited inventory, for people who do not normally wear safety glasses or glasses of any kind.

The variety of over-the-counter and non-prescription eyeglasses, such as sun glasses, is often restricted in sizes available to a customer by the number of different sizes which are commercially available and economically supportable by the volume of glasses sold at each particular store. In the case of reading and other vision correcting eyeglasses, it is as important that each pair of eyeglasses fit properly and provide wear comfort similar to an optometrist fitted pair of eyeglasses.

Customarily, in such circumstances, glasses are available in, at best, a limited number of sizes on each occasion where a new pair of eyeglasses is selected for use by the wearer. It is more often the case that such glasses do not fit each wearer in a manner consistent with needs established by safety and comfort standards. After a period of wear, it is not uncommon to see such a wearer remove the glasses, if only for a moment, to provide relief from some discomfort.

A limited number of safety and non-prescription eyeglasses comprise adjustable features such as wire forms of sides or temples which are bendable to adjust each bow which forms the curved extremity of the side or temple to fit a particular auricular dimension. Slidable adjustments for both temples and bridges are known in the art. However, such adjustments are often imprecise and short lived and become poorly adjusted after a period of continued wear.

It also known in the art to provide a rotary expansion screw coupler for adjusting separatable parts of eyeglasses. Each rotary expansion screw coupler usually comprises a medially disposed knurled portion for relatively facile finger adjustment. Generally, the spatial relation of adjusted parts of the eyeglasses is dependent upon the freedom of movement of the screw coupler, itself, or upon parts separate from the coupler, existing at other parts of the eyeglass frame. As such, long term, stable and spatially precise adjustment is not inherently realized by current rotary expansion screw coupled eyeglasses.

BRIEF SUMMARY AND OBJECTS OF THE INVENTION

In brief summary, this novel invention alleviates all of the known problems related to precisely altering and preserving critical parameters of an adjustable pair of eyeglasses to conform to the comfort and needs of a particular wearer. The invention comprises a symmetrically adjustable coupler connecting two lens portions of a frame at the bridge to form a pair of eyeglasses which are width adjustable at the bridge. To maintain spatial integrity and precision of one lens portion of the frame relative to the other lens portion of the frame, in a first embodiment, the two lens portions are assembled and joined by the coupler during a plastic molding process. In this embodiment, a moving part securing and restraining tab is conveniently added to the coupler during the molding process to deter any adjustment prior to purchase of the eyeglasses and subsequent removal of the tab. In another embodiment for frames which having metal rims, the coupler is attached by spot welding, casting, soldering or other metal to metal bonding.

The invention also comprises a frame side or temple, commonly referred to as "temple" herein, length adjusting coupler interposed between segments of a temple or between the shoulder of the frame and each temple to adjust the effective length of each temple for auricular variation relative to the lens portion of the eyeglasses. Temple lengthening couplers are attached in a manner similar to the method of attachment of the bridge coupler.

Each coupler comprises an insert which is securely affixed to a joining segment of the frame. Each insert comprises an anchoring segment by which the coupler is united to each selected joining portion of the frame. Each coupler also comprises at least one stabilizing pin which glides within the inserts to precisely guide movement of one portion of the frame relative to the other associated portion of the frame during an adjustment process and to reinforce the joint such that the each portion of the eyeglasses retains precise spatial alignment with the associated adjusted portion throughout any adjustment and thereafter. Each coupler further comprises a threaded member which is rotated within threaded holes in juxtaposed inserts to expandably separate joined parts when rotated in a first direction and to bring overexpanded parts together when rotated in a second direction. To assure long term, stable and precise adjustment, the threaded member is only rotated by a special tool. A distal part of the tool is inserted into a aperture in a central portion of the threaded member to accurately and precisely adjust separation of the eyeglass parts.

Accordingly, it is a primary object to provide a pair of eyeglasses which are precisely adjustable across a wide range of facial and auricular dimensions to provide a precise and lasting comfortable fit for each of a plurality of potential wearers of the eyeglasses.

It is another primary object to provide a precisely adjustable coupler which is incorporated into a portion of the frame of the eyeglasses and is used for intermittent adjustment of fit dimensions of the eyeglasses.

It is another primary object to provide a disposable assembly tab for the coupler which restricts adjustment of the eyeglasses until the coupler is removed.

It is an object to provide a method for precisely joining and assembling the coupler to connecting members of a frame.

It is another object to provide a method for precisely changing the lens separation of a pair of the eyeglasses.

It is yet another object to provide a method for varying the effective auricular to shoulder length of sides or temples of the eyeglasses.

These and other objects and features of the present invention will be apparent from the detailed description taken with reference to accompanying drawings.

BRIEF DESCRIPTION OF THE DRAWINGS

FIG. 3 is a magnified perspective of one of the adjustable interconnecting parts seen in FIG. 2.

FIG. 4 is a magnified sectional view taken through lines 4—4 of FIG. 1.

FIG. 5 is an exploded perspective of the parts seen in FIG. 3.

FIG. 6 is a perspective of the parts of FIG. 3 molded into a movable part containing and restraining assembly tab.

FIG. 7 is a segmental perspective wherein the tab and associated parts seen in FIG. 6 are joined with an eyeglass frame which is only seen in part.

FIG. 8 is a segmental perspective of the joined eyeglass frame of FIG. 7 with the tab removed.

FIG. 9 is a lateral elevation of two embodiments of tools used to adjust the eyeglass frame.

FIG. 10 is a perspective of an assembly tab molded about unidirectional expansion interconnecting part.

FIG. 11 is a perspective of the interconnecting part of FIG. 10 with the tab removed.

DETAILED DESCRIPTION OF THE ILLUSTRATED EMBODIMENTS

Figure 1:
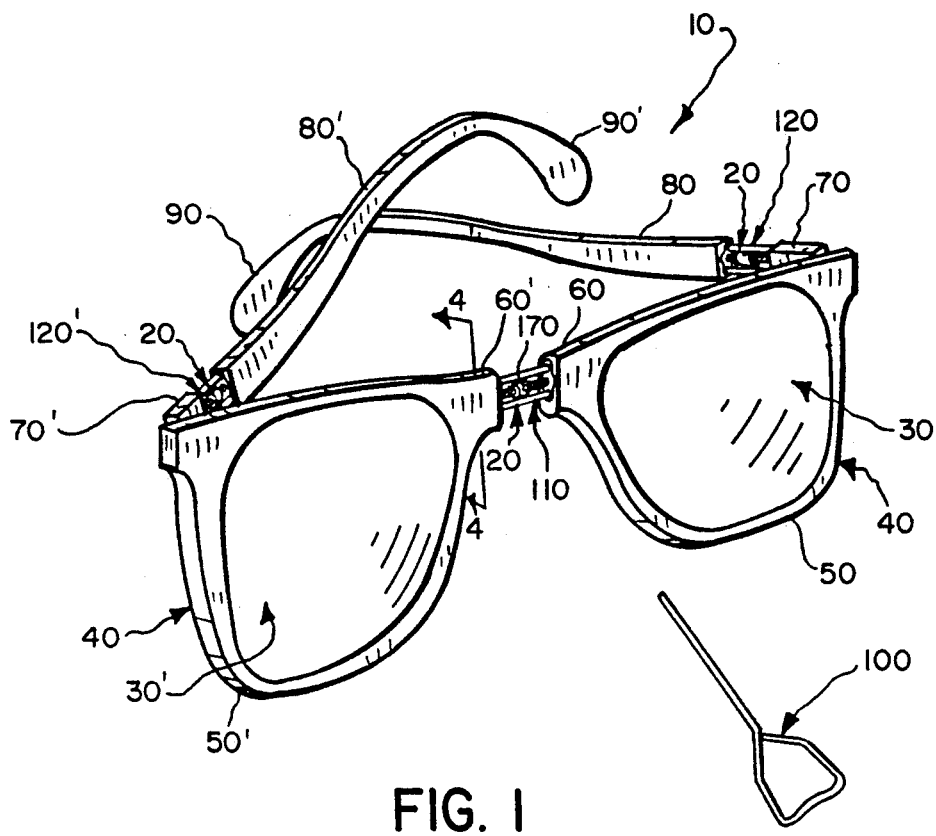
FIG. 1 is a perspective of a pair of eyeglasses comprising an adjustable frame and a tool for adjusting the frame.

In this description, the comparative term superior is a positional reference indicating greater elevation. Inferior indicates lower elevation. Reference is now made to the embodiments illustrated in FIGS. 1-11 wherein like numerals are used to designate like parts throughout. As seen in FIG. 1, a pair of eyeglasses 10 comprises a plurality of adjustable parts, generally designated 20, although a pair of eyeglasses comprising a single precisely eyeglass adjusting part, such as those described hereafter, is within the scope of the invention. Other than the adjustable parts 20, the pair of eyeglasses 10 comprises a left hand lens 30 and a right hand lens 30' installed into an eyeglass frame 40.

On the left hand side of a wearer, frame 40 comprises a rim 50 which encircles lens 30, a bridge segment 60, a shoulder segment 70, and a temple 80. Temple 80 comprises a bow 90 which involves the extremities of temple 80 which curve about the auricular root of the wearer. Disposed as a mirror image on the right hand side of the wearer, frame 40 comprises a like set of parts, but of opposite hand and designated by a prime (') after each reference number. As such, on the right hand side, frame 40 comprises a rim 50' encircling lens 30', a bridge segment 60', a shoulder segment 70', a temple 80' and a bow 90'. An adjustable part 20 adjustment tool 100 is seen separated from eyeglass 10 in FIG. 1.

Figure 2:
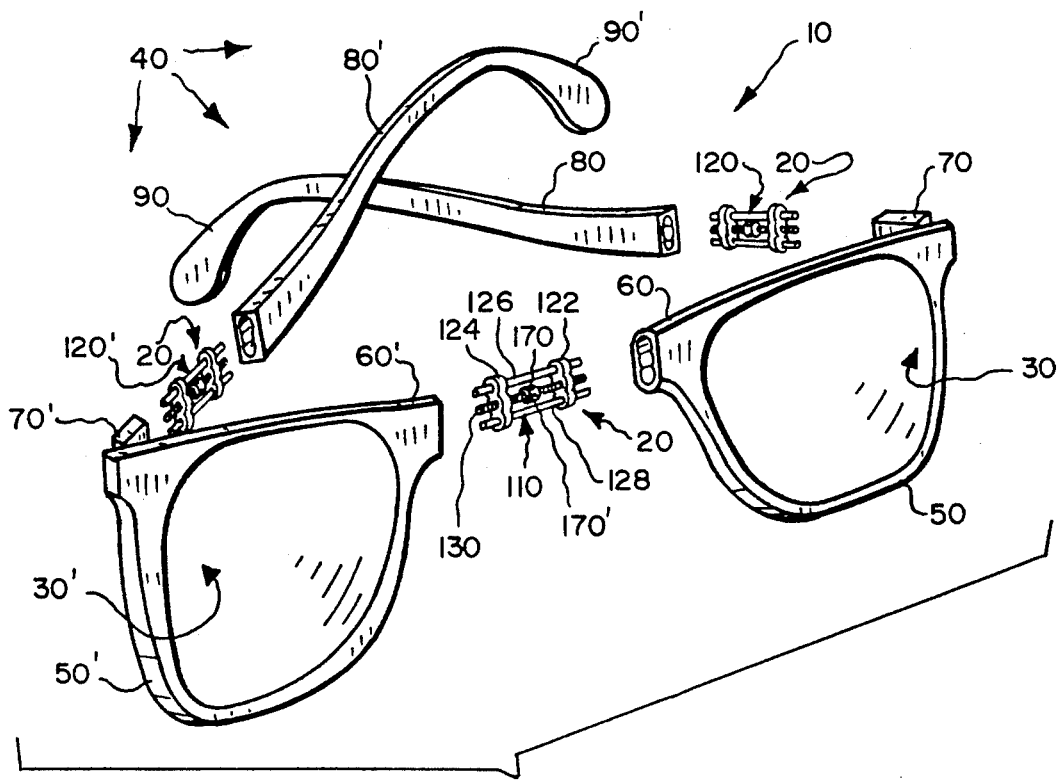
FIG. 2 is an exploded perspective of the eyeglasses seen in FIG. 1.

In the embodiment of FIG. 1, frame 40 is seen to comprise three adjustable parts 20, comprising a bridge-width adjustable part 110, a temple-length adjustable part 120 disposed on the left of a wearer, and a temple length adjustable part 120' disposed on the right of the wearer. A better view of each adjustable part 110, 120 and 120' is seen in FIG. 2. Therein, bridge width adjustable part 110 is seen to comprise a first attaching member 122 juxtaposed bridge segment 60, a second attaching member 124 juxtaposed bridge segment 60', a superiorly disposed guide pin 126, an inferior guide pin 128, and a centrally disposed expansion screw 130.

Magnified views of adjustable part 110 are seen in FIGS. 3-5 wherein attaching member 122 is seen to be an essentially solid piece comprising two parallel planar surfaces 132 and 134, a superiorly disposed aperture 136, an inferiorly disposed aperture 138 and a threaded hole 140, each hole and aperture being disposed through both surfaces 132 and 134. As is best seen in FIGS. 3 and 5, at a superior end 142, extending medially from planar surfaces 132 and 134, member 122 comprises two bevels 144 and 146, respectively. Similar medially oriented bevels 148 and 150 are disposed on an inferior end 152. The purpose of bevels 144, 146, 148 and 150 is described in detail hereafter.

Similar to member 122 but in mirror image orientation, member 124 comprises an essentially solid piece comprising two parallel planar surfaces 132' and 134', a superiorly disposed aperture 136', an inferiorly disposed aperture 138' and a threaded hole 140 , each hole and aperture being disposed through both surfaces 132 and 134'. At a superior end 142', extending medially from planar surfaces 132' and 134', member 124 comprises two bevels 144' and 146', respectively. Similar medially oriented bevels 148 and 150 are disposed on an inferior end 152. The purpose of bevels 144', 146', 148' and 150' is also described in detail hereafter.

Best seen in FIG. 5, part 110 further comprises superiorly disposed guide pin 126, inferiorly disposed guide pin 128, and medially disposed threaded expansion member 130. Guide pin 126 is preferably a solid cylindrical rod comprising a lateral radius which permits guide pin 126 to move longitudinally within each aperture 136 and 136', but which effectively restrains lateral movement of each member 122 and 124 relative to guide pin 126. Guide pin 128 is similar to guide pin 126 and is slidably attached to members 122 and 124 within each aperture 138 and 38', respectively, to move longitudinally therein but also restrain lateral movement of each member 122 and 124 relative to guide pin 128.

Expansion member 130 comprises longitudinally disposed ends 166 and 166' and a centrally disposed section 168. Section 168 comprises a substantially solid cylindrical segment integrally disposed between ends 166 and 166' and Comprises at least two laterally disposed and accessible through holes, designated 170 and 170'. Ends 166 and 166' comprise mirror image threaded surfaces 172 and 172', respectively, which threadably match associated threads of holes 140 and 140'.

The laterally disposed holes, typified by holes 170 and 170', comprise transverse radii which facilely accept insertion of a part of a tool such as tool 100 seen in FIG. 1. To expand or contract space between bridge segments 60 and 60', in FIG. 2, the inserted part of the tool, such as tool 100, is necessarily inserted into an accessible hole 170 and 170' and moved to rotate expansion member 130. Rotation of expansion member 130 in a first direction, such as that indicated by arrows 180 and 180' in FIG. 3 widens the space between bridge segments 60 and 60'. Reversing the direction of rotation shrinks the space between bridge segments 60 and 60'. To provide for continuous adjustment in a selected direction rotational direction, when rotation of the tool disposed in a first hole, such as hole 170, reaches a physically limiting position, another hole, such as hole 170', is accessible for insertion of the tool.

Due to the pitch on the threads and use of a tool comprising an extended lever arm, the separation between bridge segments 60 and 60' are precisely and fixedly set by rotation of expansion member 130 to a desired rotational position. Similarly, due to the requirement for a special tool to turn expansion member 130, once a precise setting is reached, the setting is retained until reset by again using the tool.

While guide pins 126 and 128 and member 130 can be made of any non-corrosive material having sufficient sheer strength and inelasticity to maintain the relative spatial orientation of rim 50 relative to rim 50', stainless steel is preferred. Similarly, any non-corrosive material which adequately withstands forces imposed by guide pins 126 and 128 and member 130 and which becomes solidly affixed to a molded frame 40 part during a molding process or which is otherwise securely attachable to an eyeglass frame may be used to manufacture members 122 and 124. However, it is preferred to use stainless steel in the manufacture of members 122 and 124.

Even though it is within the scope of the invention to drill into a plastic frame and affix members 122 and 124 to segments of frame 40 by bonding or the like, it is preferred to mold members 122 and 124, and in fact, the entirety of part 110 into frame 40 at the time frame 40 is injection molded. As is well understood in the molding and plastic bonding art, cavities formed between bevelled edges 144 and 146, 148 and 150, 144' and 146', and 148' and 150' are filled by synthetic resinous material which on one hand bonds with frame material and on the other hand forms a mechanical anchor against release of members 122 and 124.

While molding part 110 into frame 40 as a unitary part, a breakaway tab 190, as seen in FIGS. 6 and 7, is preferably contemporarily molded about cylinder 168. Tab 190 contains and restrains member 130 from rotating and thereby causing frame 40 to inadvertently come apart prematurely. In those cases where part 110 is attached by methods other than molding, tab 190 is applied separately to part 110.

It is a common practice to remove tab 190 at the time of purchase of a pair of eyeglasses 10. In those cases where tab 190 is molded contemporarily with frame 40, tab 190 is an integral part of frame 40 as seen in FIG. 7. So disposed, access to member 130 to adjust the relative spatial separation between bridge segments 60 and 60' is not available until tab 190 is removed. As shown in FIGS. 6 and 7, indicia in the form of an arrow 192 shows the direction of pressure placed upon tab 190 to frangibly break tab 190 from the rest of frame 40. Access to bridge segment 60 and 60' after removal of tab 190 is seen in FIG. 8.

Referring once more to FIG. 1, adjustable part 120 disposed to be used to precisely change the length of temple 80 may comprise parts like those of part 110, earlier described. Also, adjustable part 120' disposed to similarly precisely adjust the length of temple 80' may comprise parts like those of part 10.

However, other types of adjustable parts 20 may be used within the scope of the invention, such as the embodiment of expansion part 200 seen in FIGS. 10 and 11. As seen in FIG. 10, expansion part 200 comprises a breakaway tab 202, a U-shaped guide pin member 204, and a medially disposed expansion member 206. Breakaway tab 202 is physically and functionally substantially the same as tab 190, earlier described.

U-shaped guide pin member 204 is better see in FIG. 11. As seen therein, U-shaped guide pin member 204 comprises two substantially parallel legs 208 and 210 and a U-shaped base 212. Base 212 is disposed at an angle, which may be 45°, relative to legs 208 and 210. Legs 208 and 210 comprise transverse radii and physical characteristics similar to guide pins 126 and 128; however, the bend of base 212 relative to parallel legs 208 and 210 provides an effective anchor for expansion part 200 on one end of part 200 within a frame member.

As best seen in FIG. 11, expansion part 200 comprises two attaching members 214 and 216. Attaching member 216 is substantially the same in form and function as member 122. Attaching member 214 is the same as member 124 except that medially disposed hole 218 is not threaded as hole 140' is threaded in member 124. Expansion member 206 comprises a threaded end 220, a medial cylindrical segment 222, and an end cylindrical segment 224. Cylindrical segment 222 is similar in size and function to cylinder 168, earlier described, and comprises at least two through holes 223 and 223' similar in size and function to holes 170 and 170' of expansion member 164 to receive and be turned by a tool, such as tool 100. Threaded end 220, when rotated, operates to longitudinally displace attaching member 216 relative to segment 222 as rotation of end 166 displaces member 122 relative to cylinder 168.

Different from the threaded relation between hole 140' and end 166', end segment 224 is anchored in longitudinally fixed relation relative to attaching member 214, but is free to rotate. Such anchored connections are well known in the art. So interconnected, expansion member 200 comprises an asymmetric expander which displaces attaching member 216 relative to cylindrical segment 222 and attaching member 214.

Referring to FIG. 9, tools used to precisely move and set an adjustable parameter of eyeglasses 10 are made in a plurality of shapes for convenience of use. As seen in FIG. 9, tool 100 comprises a wire formed part comprising a pentagonally shaped handle 250 and a straight stem segment 252. Straight stem segment 252 terminates on the end away from handle 250 in an extremity 254 which insertably fits into holes in cylindrical parts 168 and 222, such as holes 170, 170', 223 and 223', and which comprises sufficient strength and rigidity to rotate either member 130 or 222, when so inserted.

On the other hand, a tool 260 comprises a body 262 having the shape of a writing instrument and a pocket clip 264 for easy carrying and locating. Even so, body 262 tapers to a hole insertable extremity 254' which has the same transverse dimensions and members 130 and 206 rotating characteristics of extremity 254.

Figures 12, 13:
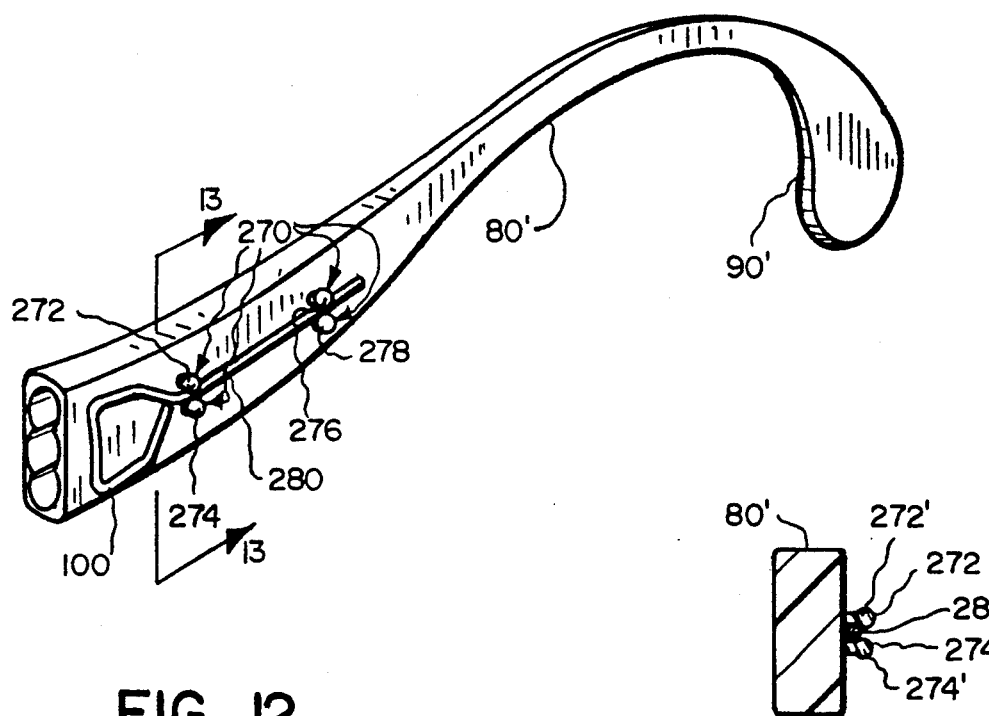
FIG. 12 is a perspective of a temple of the eyeglass frame seen in FIG. 2 with a tool attached thereto.
FIG. 13 is a cross section along lines 13—13 in FIG. 12.

For convenience, a temple, such as temple 80' seen in FIG. 12, may be fitted with a holder 270 for a tool, such as tool 100. As seen in FIGS. 12 and 13, tool holder 270 comprises four compliant and resilient protruding knobs 272, 274, 276 and 278. The knobs are disposed anteriorly and posteriorly on frame 80' to provide a snap fit for a stem section 280 of tool 100.

Two of the knobs 272 and 274 are better seen in FIG. 13 to comprise bulbous extruding ends 272' and 274', respectively, which retain stem 280 when inserted therebetween, but which are separated by a sufficient distance and comprise sufficient resiliency to permit a releasibly attachment of tool 100 to frame 80'. Further, knobs 272, 274, 276 and 278 are sufficiently compliant to be comfortably worn on temple 80' and comfortably hold tool 100 concealed from view during non-use.

Knobs 272, 274, 276 and 278 are preferably made from compliant and resilient synthetic resinous material. Attachments, made from synthetic resinous material, which are similar to holder 270 are known to be used for other purposes. Retention and wearing of tool 100 on a frame member permits a wearer to make a precise adjustment of bridge or temple separation whenever desired.

While certain materials have been specified herein to permit one skilled in the art to make and use the invention it should be understood that any materials which are functionally adequate for the purposes stated may be used within the scope of the invention. The invention may be embodied in other specific forms without departing from the spirit o essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An adjustable pair of eyeglasses comprising:
   a pair of lens frames of opposite hand separated from one another at those portions of said frames which would normally form the bridge of the eyeglasses;
   an adjustable coupler for joining said pair of lens frames at the bridge, said coupler comprising;
     first and second inserts, each insert securely affixed to one of the lens frames at a bridge site juxtaposed the other insert;
     means which threadably attach to each said first and second insert for symmetrically and precisely adjusting spatial separation of said frames, one relative to the other;
     means which glide within each first and second insert for maintaining a fixed spatial orientation of one of said frames relative to the other as the coupler is adjusted;
   wherein said means for symmetrically and precisely adjusting comprises a part interposed between the first and second inserts which rotates in one direction to increase the separation of the pair of lens frames and rotates in the opposite direction to decrease separation of the pair of lens frames and a tool for rotating said part.

2. An adjustable pair of eyeglasses according to claim 1 wherein said eyeglasses comprise holder means for concealably retaining said special tool on said frame for facile acquisition.

3. An adjustable pair of eyeglasses according to claim 1 wherein said interposed part comprises at least one transversely disposed aperture which receives the tool to accommodate precise rotation from one stable eyeglass separation state to another stable eyeglass separation state.

4. An adjustable pair of eyeglasses comprising:
   a pair of lens frames of opposite hand separated from one another at those portions of said frames which would normally form the bridge of the eyeglasses;
   an adjustable coupler for joining said pair of lens frames at the bridge, said coupler comprising;
     first and second inserts, each insert securely affixed to one of the lens frames at a bridge site juxtaposed the other insert;
     means which threadably attach to each said first and second insert for symmetrically and precisely adjusting spatial separation of said frames, one relative to the other;
     means which glide within each first and second insert for maintaining a fixed spatial orientation of one of said frames relative to the other as the coupler is adjusted;
   wherein said coupler comprises a frangible assembly tab temporarily employed as a stabilizing implement prior to use and broken away and discarded at the time of initial use.

5. An adjustable coupler for joining a pair of lens frames at an eyeglass frame bridge, said coupler comprising;
   a pair of inserts, each insert securely affixed to one of the pair of lens frames at a site juxtaposed the other insert at the bridge;
   means which threadably attach to each said insert for symmetrically and precisely adjusting and securely affixing spatial separation of said frames, one relative to the other;
   means which slidably glide within each insert for maintaining a fixed spatial orientation of one of said lens frames relative to the other as the coupler is adjusted;
   a frangible assembly tab temporarily employed as a stabilizing implement prior to use and broken away and discarded at the time of initial use.

6. A method for precisely joining two eyeglass frame members of opposite hand together in a manually adjustable relationship comprising the steps of:
   providing a pair of lens frames of opposite hand separated from one another at those portions of said frames which would normally form the bridge of the eyeglasses;
   providing a coupler comprising a first coupler insert and a second coupler insert;
   inserting into a first of said lens frames, the first coupler insert at a first predetermined bridge site;
   installing means which threadably attach to each said first and second insert for symmetrically and precisely adjusting spatial separation of said frames, one relative to the other;
   introducing into each insert means which glide within each first and second coupler insert for maintaining a fixed spatial orientation of one of said frames relative to the other as the coupler is adjusted;
   using a tool to rotate the spatial separation adjusting means in a predetermined direction to precisely adjust said joined eyeglass frame members relative to each other to a first desired separation.

7. A method according to claim 6 comprising the additional step of using the tool to rotate the spatial separation adjusting means in another predetermined direction to precisely adjust the joined eyeglass frame members to a second desired separation of one frame member relative to the other frame member.

8. A method for precisely joining an eyeglass frame member to a temple member in a manually adjustable relationship comprising the steps of:
providing a lens frames separated from the temple member at a shoulder of the lens frame;
providing a coupler comprising a first coupler insert and a second coupler insert;
inserting into the lens frames at a site juxtaposed the shoulder a first coupler insert at a predetermined site;
inserting into a site for juxtaposed connection with said first coupler insert, a second coupler insert into the temple member;
installing means which threadably attach to each said first and second inserts for symmetrically and precisely adjusting spatial separation of said shoulder and said temple member, one relative to the other;
introducing into each insert means which glide within each first and second insert for maintaining a fixed spatial orientation of one of said frames relative to the other as the coupler is adjusted;
using a tool to rotate the spatial separation adjusting means in a predetermined direction to adjust said joined shoulder and temple member relative to each other to a first desired separation and therefore effective length of said temple member to an auricular site.

9. A method according to claim 8 comprising the additional step of using the tool to rotate the spatial separation adjusting means in another predetermined direction to adjust the joined shoulder and temple member relative to each other to a second desired separation.

10. A method according to claim 8 comprising the additional step of acquiring the tool from a holder on the frame.

11. A method for providing a precisely and stably manually adjusted pair of eyeglasses comprising the steps of:
providing a pair of eyeglasses comprising means for manually precisely and stably adjusting the separation of one rim of the frame of said eyeglasses relative to the other rim of the frame the eyeglasses at the bridge of the eyeglasses and a breakaway tab which hides the adjusting means from view and use;
providing a tool for adjusting the adjusting means;
removing the breakaway tab to reveal and provide access to the adjusting means;
using the tool to act upon the adjusting means to precisely manually increase or decrease the separation of the rims;
when the precise adjustment has been accomplished, removing the tool, thereby leaving the rims and associated frame of the eyeglasses in a precisely adjusted and stable wearing and use orientation.

12. A method according to claim 11 comprising the additional steps of:
providing a means for precisely and stably adjusting the distance of a bow of a temple of said eyeglasses relative to a rim of the frame;
removing any breakaway tab to provide access to the bow distance adjusting means;
using the tool to act upon the bow distance adjusting means to precisely manually increase or decrease the separation of the bow from the rim;
when the precise adjustment of the bow relative to the rim has been accomplished, removing the tool, thereby leaving the relative distance of the bow to the rim in a precisely adjusted and stable wearing and use orientation.

13. A method of forming a precisely adjustable stable eyeglass frame comprising the steps of:
providing a mold for the eyeglass frame comprising at least one means for incorporating at least means for manually expanding a portion of the frame as part of the molded product;
providing the at least one expansion member which accommodates precise and stable expansion and contraction of said portion of said frame;
molding said frame;
concurrent with the molding of said frame, molding a breakaway tab about said at least one expansion member to limit access and operation of said frame portion expanding means until distributed for use.

14. An adjustable pair of eyeglasses comprising:
a pair of lens-carrying frame members of opposite hand separated from one another by an adjustable bridge coupling member;
each frame member comprising bore receptacle structure comprising a threaded bore, the two threaded bores being oppositely threaded and aligned with each other;
the adjustable bridge coupling member comprising shaft structure comprising oppositely directed threads at oppositely extending shaft ends, the two threaded shaft ends oppositely threadedly engaging the threads of the threaded bores respectively such that rotation of the shaft structure in one direction turns each threaded shaft end into the associated frame member threaded bore to shorten the bridge distance between the frame members and rotation of the shaft structure in a second direction turns each threaded shaft end out of the associated threaded frame member threaded bore to lengthen the bridge distance between the frame member;
the adjustable bridge coupling member further comprising guide and support structure located adjacent to the shaft structure and comprising opposite ends which are respectively oppositely and reciprocably disposed within the two bore receptacle structures;
at least one frame member comprising two parts interconnected by length adjustable structure, the length adjustable structure comprising a threaded shaft structure which turns into and out of threaded bores in the two parts to shorten and lengthen the frame member, the length adjustable structure further comprising guide and support structure disposed adjacent the threaded shaft structure and comprises opposite ends respectively oppositely and reciprocably disposed in the two parts.

* * * * *